United States Patent [19]

Dick, Jr.

[11] 4,208,188

[45] Jun. 17, 1980

[54] CONSOLIDATION OF COAL SLURRY

[75] Inventor: Perry J. Dick, Jr., Pittsburgh, Pa.

[73] Assignee: Signet Corporation, Pittsburgh, Pa.

[21] Appl. No.: 888,862

[22] Filed: Mar. 22, 1978

[51] Int. Cl.$^2$ .......................... C10L 5/00; B01D 33/00
[52] U.S. Cl. .................................... 44/10 R; 44/10 G; 44/13; 210/386
[58] Field of Search ....................... 44/2, 10 G, 11–13, 44/28–31, 10 R; 210/386; 100/126, 118

[56] References Cited

U.S. PATENT DOCUMENTS

| | | | |
|---|---|---|---|
| 216,958 | 1/1879 | Hudson | 44/30.1 |
| 1,222,209 | 4/1917 | Hinchley | 44/29 |
| 1,455,728 | 5/1923 | Horst | 44/31 |
| 3,070,485 | 12/1962 | Strickman | 44/13 X |

FOREIGN PATENT DOCUMENTS 19571 of 1901 United Kingdom ........................ 44/32

*Primary Examiner*—Carl F. Dees
*Attorney, Agent, or Firm*—James R. Laramie; Mary Helen Sears

[57] ABSTRACT

A process for producing substantially clean water and consolidated slugs of fuel from coal slurry having less than about 30 percent by volume of ash and other impurities on a dry basis is disclosed which comprises (a) placing a quantity of the coal slurry in an enclosed chamber in which means have been provided for drainage of the water from the slurry, and (b) subjecting the slurry to one-dimensional consolidation by the application of compressive stress, thereby producing (i) substantially clean water and (ii) a consolidated, uniformly-shaped slug of fuel having a water content of less than about 10 percent.

26 Claims, 11 Drawing Figures

CONSOLIDATION OF COAL SLURRY

BACKGROUND OF THE INVENTION

1. Field of the Invention

This invention relates to a process and an apparatus for producing substantially clean water and consolidated slugs of fuel from coal slurry.

2. Description of the Prior Art

In a coal mining operation, coal is removed from the mine and passed to a crushing plant where it is comminuted or crushed to facilitate removal of sulfur, ash and other impurities. During the crushing operation, the coal is washed with water to entrain particles of coal, sulfur and ash thereby greatly reducing the danger of fire, explosion and airborne coal dust hazards. Coal cleaning, which is required primarily to reduce the sulfur and ash content, has become an increasingly important factor in coal preparation in order to meet the tighter environmental standards. The following methods are currently employed to extract and upgrade the quality of the coal which methods result in the very fine-grained coal being lost to the washing and finally being disposed of as slurry refuse. These methods can also be employed to upgrade the quality of the slurry refuse.

The particles in the slurry can be classified by means of a hydrocyclone, a sizing device consisting of a conical-cylindrical apparatus which operates under a pressure of more than 5 psi. By means of rotational fluid-solid motion, particles in the slurry are separated according to their mass.

Another method of upgrading coal slurry is by concentration. Froth flotation is a complex physicochemical process which takes place in a slurry in which the surface of one or more minerals are made water-repellant and responsive to attachment to air bubbles. Beneficiation is accomplished when air bubbles are pumped into the slurry and coal-laden bubbles rise to the surface, leaving behind minerals which have not responded to the treatment. Flotation chemicals and reagents, called collectors and modifiers, attach themselves to the mineral surface through physical and chemical sorption.

Another method is mechanical dewatering in which water is removed by means of gravity or centifugal forces through screens or sedimentation. Sedimentation is used either for clarification or thickening. Thickening increases the concentration of solids in the slurry, whereas clarification is designed to produce a solid-free slurry. Using a centrifuge without screens, solids are segregated at the bottom toward the outside of the centrifuge and water is collected and decanted off from the center. The most common screening method used is vacuum filtration through a 40×60 mesh stainless steel screen. Air is sucked through the slurry and the screen resulting in a cake of solids and a filtrate which is drawn off.

A further method of dewatering coal slurry is by thermal drying. This can be accomplished by directly contacting the slurry with warm air, directly contacting the slurry with the heated shell of the dryer or heated particles, or by radiation from a hot surface to the slurry.

All the above-mentioned methods of slurry dewatering or extraction of fine coal are expensive and are being incorporated to various degrees in only the most recently built preparation plants. Those plants which have been in operation for some time do not have these facilities and it is either impractical or too expensive to install these new coal upgrading techniques. As a result, the fine particles of coal, clay, sulfur, iron and other impurities, which form a major part of the slurry refuse coming out of a substantial number of coal preparation plants currently under production, are still being pumped to settling or slurry ponds where the heavier particles settle out and some of the water may be returned to the plant for additional washing operations or otherwise disposed of.

The compositions of the many slurry ponds throughout the country vary widely depending on the composition of the coal being mined and the type of coal extraction and preparation operations. In fact, the composition in each individual slurry pond varies depending on particle sizes, location with respect to the inlet pipe and even in relation to such variables as the prevailing wind. Over the years many hundreds of acres of coal slurry has been collected in hundreds of ponds throughout the world. These slurry ponds are not only ugly blemishes on the countryside, but are hazardous to man and animal and detrimental to the environment. The vast quantities of water used to wash the coal become polluted by the coal particles and other associated mineral impurities washed from the coal resulting in large amounts of coal in the form of particles which cannot be reclaimed for use as a valuable fuel but are disposed of as waste.

Thus, a significant problem associated with coal processing is the dewatering and drying of the refuse products in slurry form. Fine coal handled or cleaned in slurry form in coal preparation plants must be dewatered to rend it suitable for conveying and blending, to decrease transportation costs, and to increase its heating value. Fine refuse dewatering is very difficult and expensive and is therefore not commonly used because it would represent a significant portion of the overall cost of coal washing.

Prior to the present invention, the coal particles in coal slurry could not be utilized for their fuel value without first removing most of the water since about 100 Btu/lb are lost for every 1 percent of water content in the coal and because the coal slurry is difficult to handle and convey. The centrifuging and heating methods presently used to remove the water are slow, expensive and inefficient. Once the water content has finally been reduced, the coal must then be compacted by a briquetting technique into a form which is easy to handle. However, in spite of these methods all of the polluted slurry ponds remain and more are constantly being built to meet the demands of the washing plants.

In U.S. Pat. Nos. 2,800,072, 3,276,594, 3,540,586, 3,762,560 and 3,900,403 filter presses are disclosed which product filter cakes and filtered liquids from slurries. U.S. Pat. No. 4,019,431 discloses a process for dewatering sludge by compression of sludge cakes between movable filter bands to force out the water. U.S. Pat. Nos. 436,044, 478,539, 504,098, 1,231,929, 1,344,261, 1,631,037 1,647,075, 2,076,315, 2,275,398, 2,623,432, 2,675,304, 2,937,080 and German Pat. No. 823,442 disclose various apparatus having cylinders and pistons for separating liquids from solids or liquid-solid mixtures and U.S. Pat. Nos. 2,331,126, 2,358,765, 2,697,979, 2,904,835, 3,055,290, 3,548,456 and 3,736,083 disclose various apparatus with cylinders and pistons for forming briquettes of particulate material. U.S. Pat. Nos. 4,049,390 and 4,049,392 disclose apparatus for extruding briquettes of a mixture of powdered coal and a binder. U.S. Pat. No. 3,288,293 discloses an apparatus for removing water from coal mud or peat. However, none of the prior art methods or apparatus indicated above disclose the production of substantially clean water and a useful fuel product from coal slurries by mechanical means.

SUMMARY OF THE INVENTION

The disadvantages and limitations of the prior art methods for the removal of water from coal slurry have been alleviated by the present invention. In accordance with the present invention, substantially clean water is produced from coal slurry having less than about 30 percent by volume of ash and other impurities on a dry basis by subjecting the slurry to consolidation stresses which are sufficient to remove most of the water from the slurry in a relatively short period of time. A mixture of water and particles of coal, ash and other impurities such as sulfur compounds having a water content preferably above the liquid limit of the mixture is placed in an enclosed apparatus in which it can be subjected to high compressive stress with provisions being made for the water to be drained from the slurry, and consolidated under a pressure of about 900 psi to about 5000 psi for a period of less than about 1 minute. The coal slurry is preferably compressed by subjecting it to one-dimensional consolidation by applying stresses through a piston in a cylindrical apparatus with a drainage outlet provided through the piston through which water will flow upon application of stress to the slurry. The drainage outlet must be of a size and shape which will retain most of the particulate material contained in the slurry under the applied stress. The dimensions of the apparatus should preferably be such that the depth of the slurry placed in the cylindrical consolidation chamber is about the same as or less than the diameter of the chamber during consolidation thereof. When the coal slurry is consolidated, two products are formed associately—substantially clean water and a uniformly-shaped slug of combustible fuel containing less than about 10 percent water, having a density in the range of about 90 to 100 lb/ft$^3$ and a heating value in the range of about 10,000 to 13,000 Btu/lb.

Figure 1:
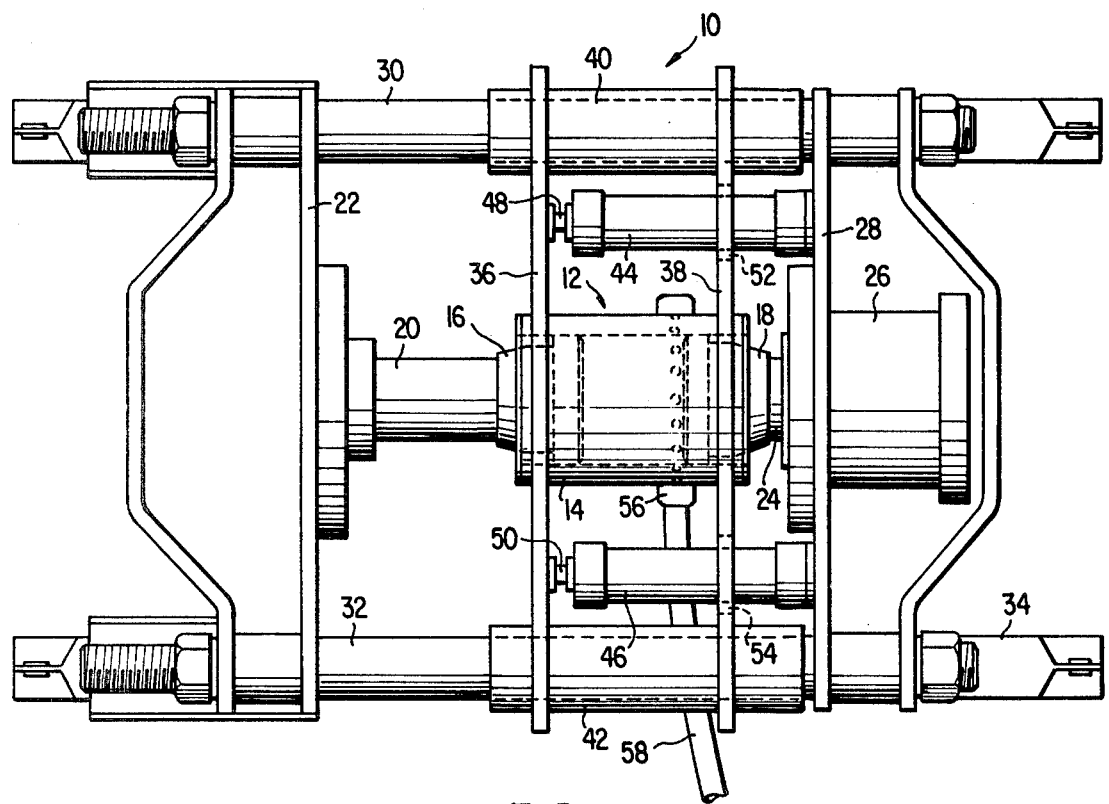
FIGS. 1-3 are plan views of one embodiment of an apparatus in accordance with the present invention showing sequential steps in the operation of the apparatus.
Figure 4:
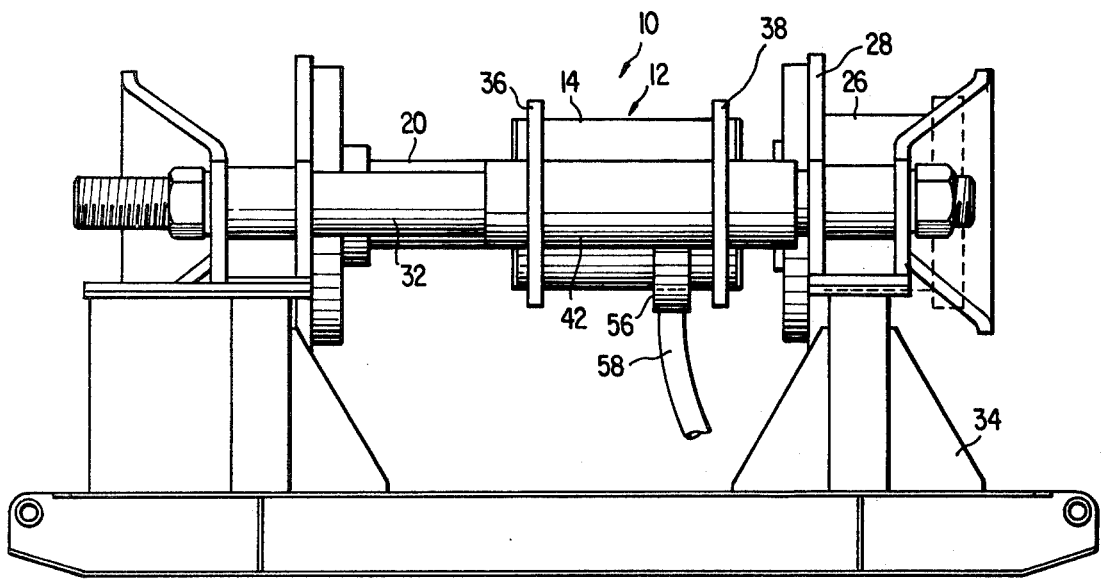
FIG. 4 is a side elevational view of the apparatus shown in FIGS. 1-3.

DESCRIPTION OF THE PREFERRED EMBODIMENTS:

The present invention relates to a process and apparatus for producing substantially clean water and consolidated slugs of fuel from coal slurry. The term "coal slurry" as used herein with respect to the present invention refers to mixtures of water and small particles of coal, ash and other impurities such as sulfur compounds which have been produced by processes for beneficiation of mined or stripped coal or which have been produced to facilitate transportation of the coal through slurry pipelines. The term does not refer to naturally occurring coal muds or peats mined in Europe which are more fibrous in nature.

Coal slurry generally has a water content of more than about 30 percent with the balance being small particles of coal, ash and other impurities. Most coal slurries have ash contents of less than about 30 percent by volume of the solids, and generally in the range of about 5 to 30 percent by volume of the solids. The major constituent of the ash consists of clay particles which are fine-grained and consequently possess considerable surface area. As a result, the clay size particles can absorb substantial amounts of water on their surfaces, resulting in substantially decreased permeability of the slurry and difficulty in removing the water from the slurry by simple draining techniques.

If a slurry of coal is placed in a piston and cylinder arrangement and subjected to one-dimensional consolidation stress, water will immediately begin to seep out from the mixture and continue to do so over a considerable period of time on an increasingly reduced rate and the slurry mixture will become increasingly more consolidated over time. Essentially, the process consists of transient flow of fluid through the slurry structure which compresses in time under the influence of the externally applied stresses. This compression takes place through the gradual transfer of the applied stresses from the pore water to effective stresses. The initial consolidation occurs as soon as the load is applied, largely by compression and solution of the air in the voids between the particles. It also includes small amounts of compression of the solid phase and the water. The final compression of the slurry is primarily due to a change of saturation, if partially saturated, and change of void ratio of the slurry mixture. Under applied loads, the pore water pressure changes which, in turn, changes the gas pressure in bubbles. This causes a change in the volume of the bubbles due to a reduction in volume and an increase in the amount of gas dissolved in the pore liquid. After the excess hydrostatic pressure caused by the externally applied stresses has been dissipated, the compression does not cease. Instead it continues very slowly at an ever-decreasing rate indefinitely. This appears to be the result of a plastic readjustment of the soil grains to the new stress, of progressive breaking of the interparticle bonds, and even progressive crushing of the particles themselves.

Overall deformation of the slurry occurs as an integration of the usually irreversible movement of very small irregular particles under the microscopic stress patterns set up by the applied loads and the random geometry of the individual grain to grain contacts. On application of load to randomly oriented slurry, deformation occurs in the direction of the particles under the microscopic stress patterns set up by stress due in part to the approach of parallel clay plates under the stress and in part to a reorientation or rotation of some of the particles under the influences of microstresses in the clay structure, exhibiting the microscope deformation called consolidation.

After the removal of the externally applied load, the only mechanism which will try to bring the reoriented particles back to their original position is the elastic interaction at the points of contact of the particles. The osmotic or electrostatic forces between parallel sets of particles oriented at right angles to the applied stress direction may also act to try to drive the particles apart to their original equilibrium resulting in small expansion.

The percentage of consolidation of the slurry depends on a number of factors including the permeability of the mixture which governs the rate of flow of the water, the thickness of the slurry being compressed which influences both the volume of water that must seep out and the distance it must travel and the hydraulic gradient, and the number of pervious boundaries of the slurry being compressed from which the water can leave.

It was found that when coal slurry was subjected to one-dimensional compression in an apparatus consisting of a cylindrical mold and piston at pressures of about 900 psi to about 5000 psi for periods of less than about 1 minute the water would first drain out from the area nearest the drainage outlets. This resulted in considerable consolidation of the slurry in these areas with an accompanying decrease in permeability nearest the points of drainage. As a result, the time required for water further away from the drainage outlets to drain through this partially consolidated layer of low-permeability is increased significantly and further noticeable drainage of water in a short period of time would take place only under very high pressure gradients.

It will be understood that in order to utilize a process effectively to clean up the water in hundreds of acres of coal slurry ponds and to produce usable slugs of a combustible fuel at a cost which is less than the value of the clean water and the fuel slugs, an apparatus must be used which produces several slugs per hour without the need for exceedingly high pressure equipment.

For example, it had been found that in an apparatus in which the cylindrical wall of the consolidation chamber was porous and provided the drainage outlet for the water, best results were obtained when the effective drainage path was less than about 3-4 inches. Since drainage occurs through the porous walls of the cylinder, the diameter should be less than about 6 inches so that the distance the water must travel before draining is less than about 3 inches. If the drainage path is greater than that, then on application of pressure, the slurry nearest the drainage outlet become consolidated and has very low permeability and the slurry furthest from the outlet is in the form of a mud-like slurry. It was also found that the depth of the slurry placed in the cylinder should be less than about 1.5 to 2.5 times the diameter for effective consolidation of the slurry and removal of the water. If significantly higher pressures were employed or if the stress were applied to the slurry over an exceedingly long period of time, e.g. two to three days, the water would eventually drain through the consolidated slurry having low permeability. However, use of an apparatus requiring such high pressures or long cycles to produce a single slug would not be economically practical.

In accordance with the present invention, however, it was found that if drainage was provided through the face of the pistons in the cylindrical consolidation chamber with the cylinder walls solid, slurry placed in the chamber to a depth of up to 12 inches could be readily consolidated using the same total pressure of about 150 tons which was applied to the 6-inch diameter chamber by increasing the diameter of the chamber to about 12 inches. Thus, with about one-fourth of the p.s.i. applied to the piston, about four times the volume of slurry could be consolidated effectively. It is preferable, therefore, that the dimensions of the present apparatus be such that the depth of the slurry placed in the cylindrical consolidation chamber be less than about 1.5 to 2.5 times the diameter of the chamber during consolidation thereof and that the diameter be as large as practical in order to remove the water from and consolidate the greatest amount of slurry for a given period of time.

The slurry disposal ponds are generally filled by pumping slurry at one end of the disposal site through a pipe from the crushing and washing plant. The coal slurry flows over the whole area of the pond with the heaviest particles settling out near the inlet pipe and the lighter particles settling out away from the point of discharge depending upon their size. When the slurry was obtained from the area of the pond nearer the inlet pipe, it was found that the slurry could be readily compressed in an apparatus in which the drainage holes were about 1/64 inch in diameter. However, when the slurry was obtained from the area of the pond containing very fine particles, the slurry itself was ejected through the drainage holes as well as through the annular space between the piston and cylinder upon application of pressure to the piston. It was found, for example, that even if the end surface of a cylinder were machined flat and securely fastened to a machined flat plate, so that there was zero tolerance, the application of the pressures contemplated herein to a piston in the other end of the cylinder would force slurry between the cylinder and the plate. It was also found that if the total tolerance between the piston and the inner wall of the cylinder was not less than 0.010 inch or if a piston ring was not used as described hereafter, slurry would be forced out the annular space between the piston and the cylinder. Thus, an apparatus must be employed which will effectively remove the water from a slurry containing essentially any size particles of coal, ash and other impurities. This can be achieved by covering the holes with a porous member such as a filter or screen having a pore or mesh size which will retain the smallest desirable particles in the slurry. The pore or mesh size need not necessarily be smaller than the size of the smallest particles since it was found that during consolidation many of the particles tend to agglomerate near the screen. It is important, however, that the porous member be sufficiently strong to withstand high pressure so that the size of the pores are not enlarged to the size of the drainage holes themselves when the slurry is being consolidated. It was found, quite unexpectedly, that substantially clean water could be removed from coal slurry during consolidation with a screen having a mesh size in the range of about 50 to 100 microns. A stainless steel screen having a mesh size of 75 microns was found to be particularly suitable. This is particularly remarkable since essentially all of the particles in coal slurries produced from beneficiation processes are less than 75 microns in size and the great majority are in the range of 0-50 microns in size. It was found, for example, that when a porous member was used in which the pores were substantially round and the pore size was about 6 microns, upon application of the compressive stress the pores were readily filled with solid particles from the slurry and after two or three cycles of the apparatus all of the pores became so clogged that no water could pass through the porous member. It was also found that when some of the coal slurry was placed on top of the screen and spread around with a hand, the slurry would pass through the screen. However, when compressive stress is applied to the slurry at the pressures contemplated herein, only an extremely minor amount of the finest particles pass through the screen. This is believed to be the result of the particular porous structure of the screen. For example, the wires on a 75 micron screen are woven so closely together that viewed from above, the pores in the mesh are extremely minute. When viewed from the end of the screen, quasitriangular interstices can be seen where adjacent wires alternate over and below a given cross wire. Thus to pass through the screen, a particle must first pass into the interstices between the wires and then pass in a direction parallel to the surface of the screen through the quasitriangular interstices. Since most of the solid particles in the slurries are approximately spherical although irregular, they are unable to pass through readily during consolidation. When coal slurries are subjected to one-dimensional consolidation under the application of the pressures contemplated herein, water does not drain gradually from the slurry nor does the slurry gradually become consolidated. Rather, upon application of compressive stress, the water drains and the solid particles become consolidated to the degree described herein within a matter of a few seconds. When this occurs, the particles tend to agglomerate quickly and bridge the interstices of the screen rather than following the tortuous path through the screen. Moreover, this screen was sufficiently strong to withstand the high pressures applied to the pistons and was found to effectively retain solid particles in the slurry much smaller than its mesh size without becoming clogged. Thus, it is believed that any porous member having the quasi-triangular pore structure of a screen having a mesh size in the range of about 50 to 100 microns can be effectively employed in the apparatus of the present invention. Porous structures which are open and in which the pores are squared, rounded or like a slit will not prevent the passage of solid particles therethrough, or if closed sufficiently to prevent the passage of solid particles then the pores will become clogged.

A consolidation and separation apparatus in accordance with the present invention is not limited in use to the consolidation of coal slurry. Such an apparatus can be used effectively to remove water from any aqueous slurry or dispersion of solid particulate or fibrous material and to form a consolidated slug of the solid material. Coal slurry is illustrative of the slurries disposed of as waste by many industries which have been plagued by the immense disposal problem they create. These industries are continuously producing extremely large volumes of these slurries for which an effective means of removing water therefrom and consolidating the solid material contained therein has not heretofore been found. For convenience, the term "aqueous slurry" is used herein to refer to any aqueous dispersion or slurry of solid particulate or fibrous material. For example, such an apparatus is particularly suitable for use in consolidating sewage and removing water therefrom. Slurries of bauxite tailings, phosphate tailings, copper ore tailings, taconite, and paper fibers can also be consolidated and water can be effectively removed therefrom with such an apparatus.

Referring now to the drawings, FIGS. 1 to 11 illustrate the preferred embodiments of a consolidation and separation apparatus in accordance with the invention. Referring to FIG. 1 which is a plan view of one embodiment of the apparatus, the numeral 10 refers to the apparatus generally and the numeral 12 refers to the consolidation chamber generally. Consolidation chamber 12 comprises a solid cylindrical wall 14 and two pistons 16 and 18 extending into opposing ends of the cylindrical wall 14. Wall 14 is shown with a liner 15 which can be readily replaced when repeated use of the apparatus has caused the first liner to become worn. Piston 16 is securely attached to piston rod 20 which in turn is securely attached to supporting member 22. Piston 18 is securely attached to piston rod 24 which is reciprocated by pressure means 26, such as an hydraulic cylinder, which is securely attached to supporting member 28. Supporting members 22 and 28 are securely attached to supporting rods 30 and 32 which in turn are securely attached to supporting frame 34. Cylinder wall 14 is securely attached to supporting members 36 and 38 which are in turn securely attached to hollow cylindrical members 40 and 42. Cylindrical members 40 and 42 are slidable horizontally on supporting rods 30 and 32. Pressure means 44 and 46, such as the hydraulic cylinders shown, are securely attached to supporting member 28. Reciprocating piston rods 48 and 50 extending from cylinders 44 and 46, respectively, are securely attached to supporting member 36. Cylinders 44 and 46 extend through openings 52 and 54 in supporting member 38. The aqueous slurry to be consolidated is fed to the consolidation chamber 12 through conduit 56 which communicates with the interior of the consolidation chamber by means of holes through cylindrical wall 14. Conduit 56 extends around the lower half of cylindrical wall 14. Predetermined amounts of slurry are fed to conduit 56 by means of feed hose 58 which communicates therewith.

Figure 6:
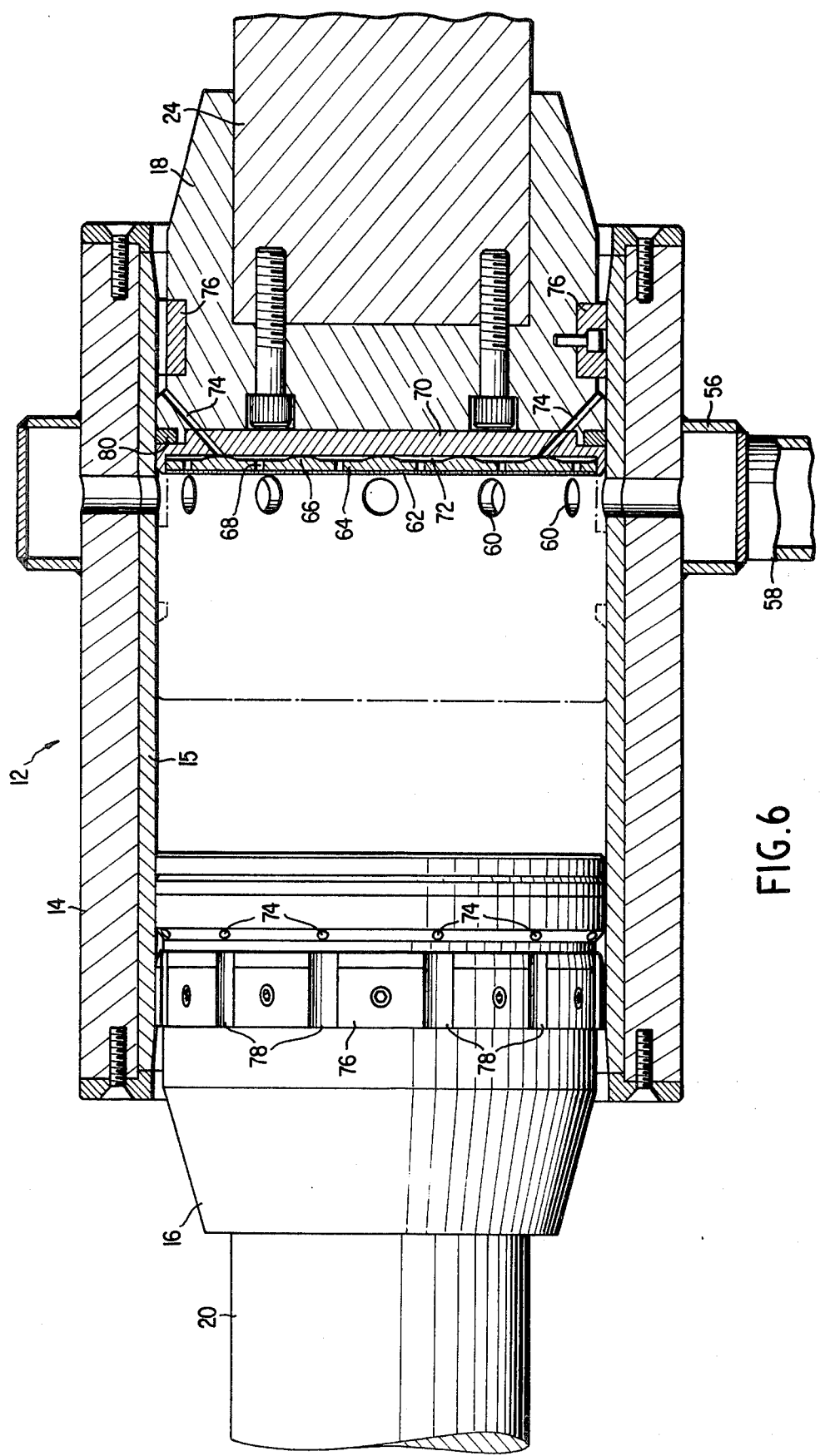
FIG. 6 is a detailed plan view of the consolidated chamber shown in FIG. 1.

FIG. 6 is an enlarged detailed plan view of consolidation chamber 12 partially cut away to show the interior thereof. Piston 18 is shown attached to piston rod 24 in the retracted position in which holes 60 are open to the interior of consolidation chamber 12. In this position, slurry fed to conduit 56 can enter chamber 12 through holes 60. Since pistons 16 and 18 are identical, piston 16 is not cut away so that both the interior and the exterior of the pistons can be shown. On the surface of the pistons is porous member 62, such as the stainless steel screen described above. Behind porous member 62 is plate 64 having a flat surface adjacent porous member 62 and a second surface opposite the flat surface having raised portions 66 thereon. Holes 68 having an inside diameter of about 1/16 inch extend through the plate 64 at the portions of the plate at which the surface is not raised. Behind plate 64 is flat plate 70 which is in surface contact with the raised portions 66 of plate 64. By the contact of plates 64 and 70 in this manner, communicating passageways 72 are formed around the raised portions of plate 64. Holes 74 through plate 70 and piston 18 provide a means of communicating passageways 72 with the space between the piston 18 and the cylinder wall 14. Surrounding each piston is an annular bushing 76 having recessed areas 78 therein. Adjacent plate 70 and recessed in the piston is piston ring 80. If the two ends of the piston ring are cut at an angle less than 90° from the surface nearest the circular surface of the piston, pressure applied against that surface of the piston will cause the piston ring to expand outward against the inner wall of cylinder 14 insuring zero tolerance between the piston and the cylinder.

Figure 2:
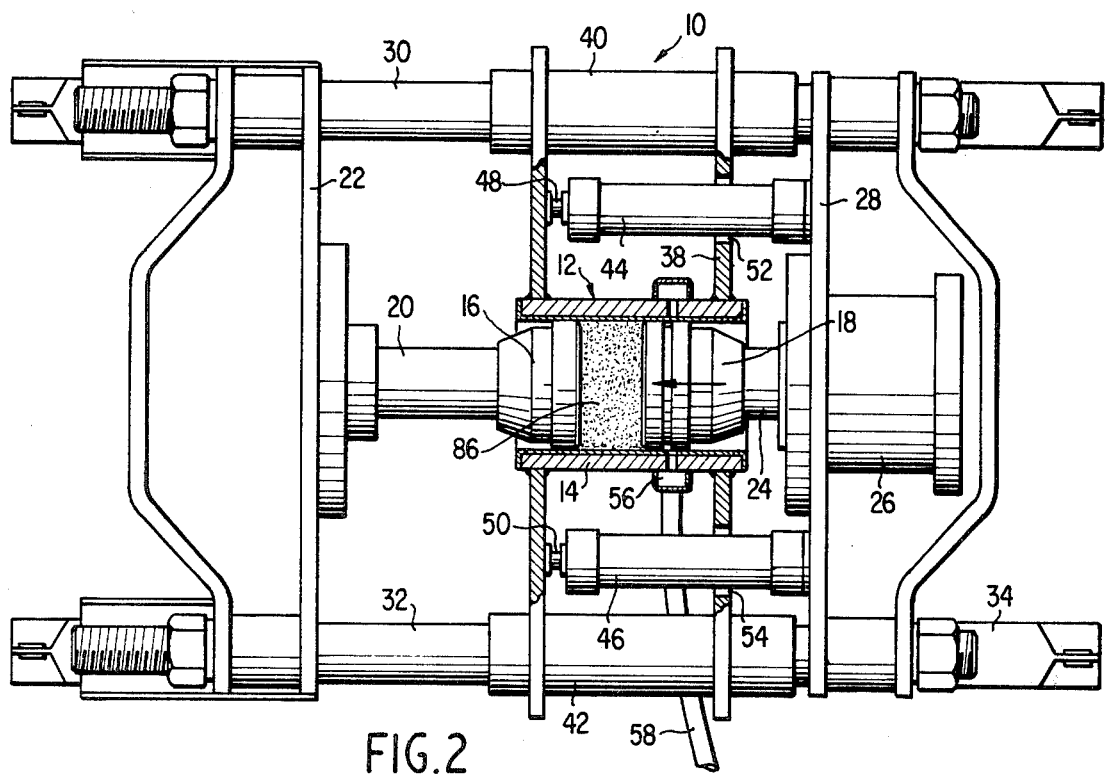
Figure 3:
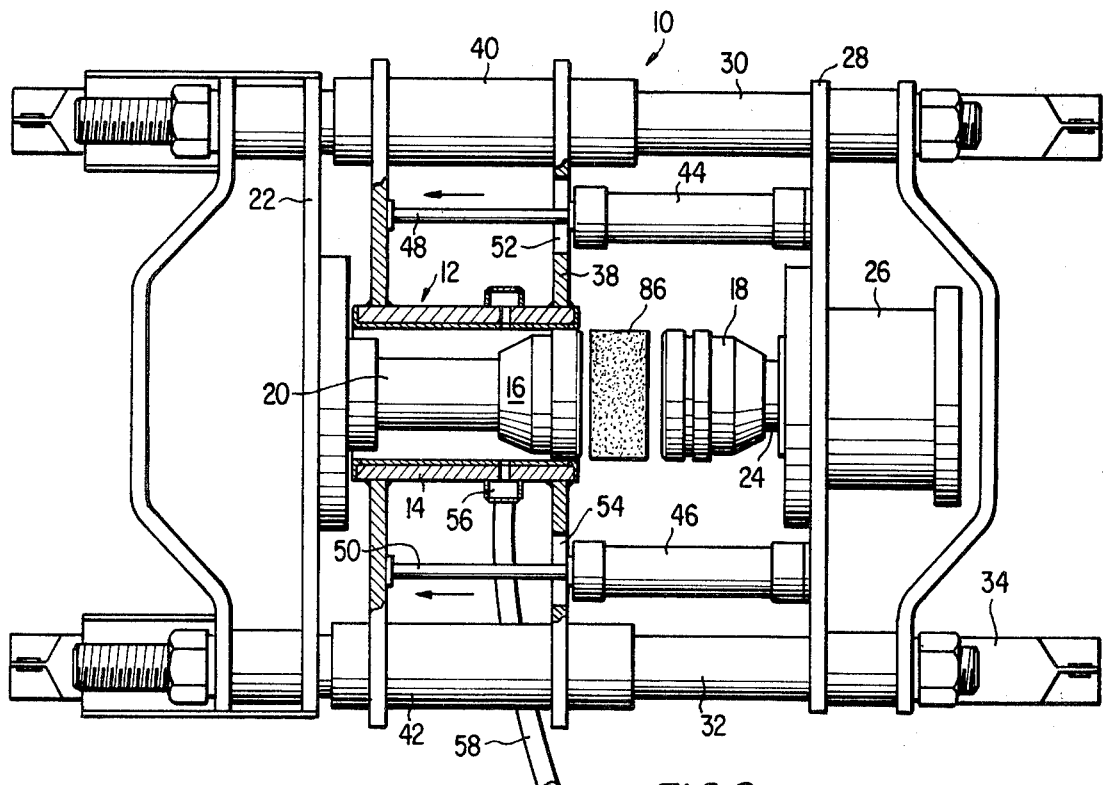
Figure 5:
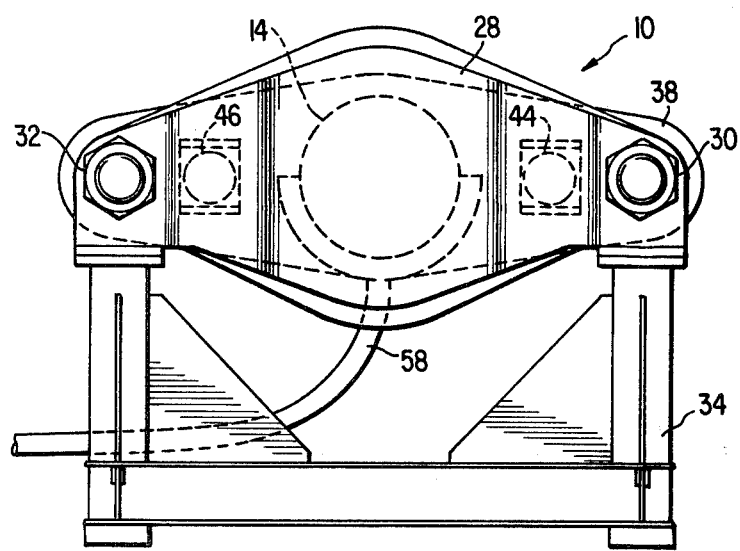
FIG. 5 is an end elevational view of the apparatus shown in FIGS. 1-3.

The operation of the apparatus 10 is shown sequentially in FIGS. 1 to 3. Referring to FIG. 1, piston 18 is in a retracted position with piston rod 24 retracted within reciprocating pressure means 26. Consolidation chamber 12 is held in a position between the two pistons by supporting members 36 and 38 which are held stationary by reciprocating pressure means 44 and 46 having piston rods 48 and 50 in a retracted position. In this position, the interior of consolidation chamber 12 communicates with conduit 56 through holes 60 in cylinder wall 14. A predetermined amount of slurry to be consolidated is fed through feed hose 58 into conduit 56. From conduit 56 the slurry moves through holes 60 and fills the interior of chamber 12. After the consolidation chamber has been filled, pressure means 26 is actuated and applies compressive stress to piston 18 thereby compressing the slurry in chamber 12 (FIG. 2). When the slurry is subjected to this one-dimensional consolidation, substantially clean water is removed from the slurry and drains through porous member 62, through holes 68 in plate 64, through passageways 72, through holes 74 to the space between the pistons and wall 14, through recessed areas 78 in bushing 76 and finally is collected outside of chamber 12. Following consolidation of the slurry and removal of the water therefrom, piston 18 is retracted by pressure means 26 (FIG. 3). At the same time, the cylinder wall 14 is removed from the slug of consolidated slurry 86 by actuating pressure means 44 and 46 which apply compressive stress to supporting member 36 attached to wall 14. As piston rods 48 and 50 extend, cylindrical members 40 and 42, also attached to supporting member 36 as well as supporting member 38, slide horizontally to the left on supporting rods 30 and 32. This horizontal movement by supporting members 36 and 38 attached to cylinder wall 14 removes the wall from the slug which is held stationary by piston 16. After the wall 14 is completely removed from the slug 86, the slug falls below the chamber 12 and can then by collected or conveyed away appropriately. Pressure means 44 and 46 are then actuated thereby retracting piston rods 48 and 50 and sliding cylinder wall 14 back to its original position. The entire procedure can then be repeated.

Figure 7:
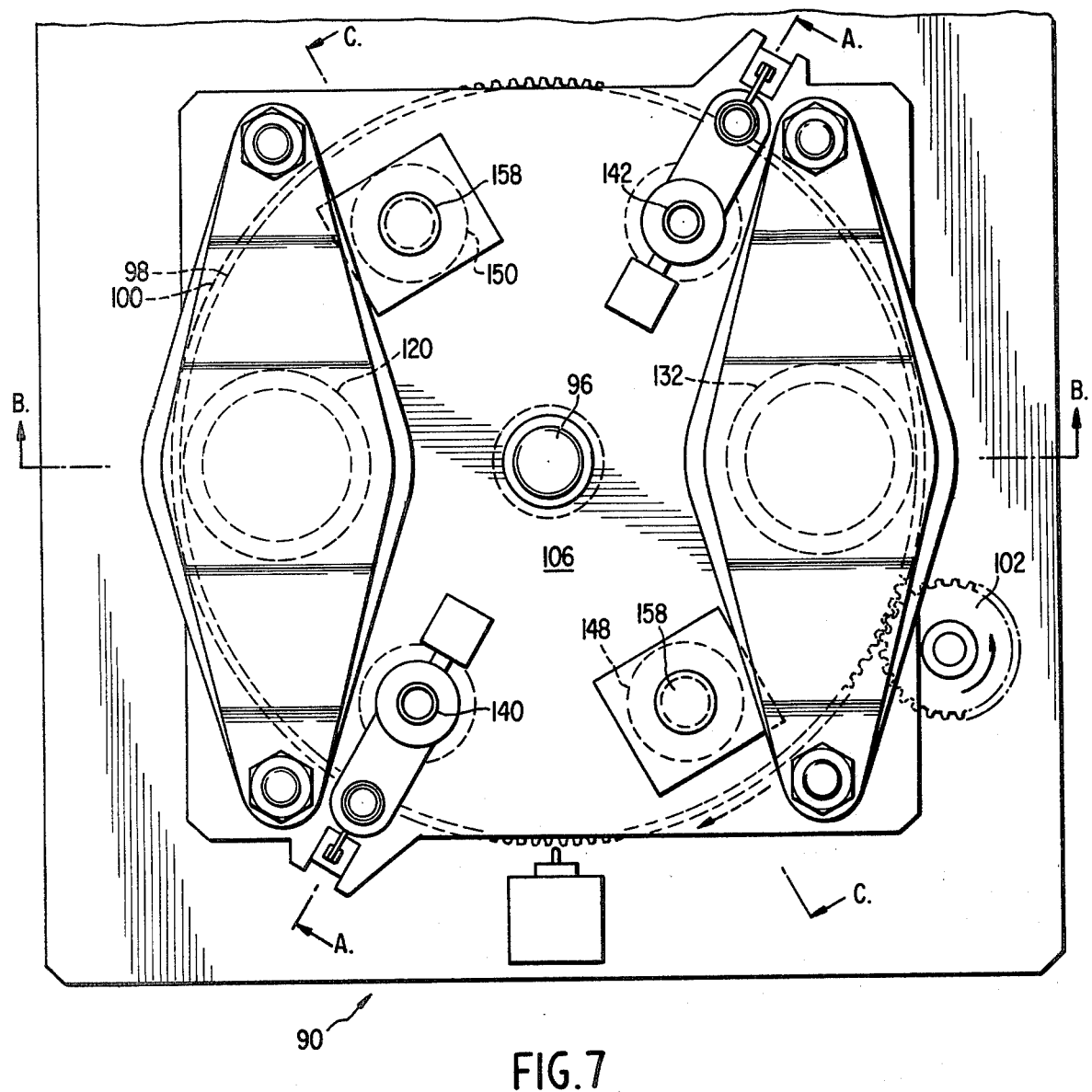
FIG. 7 is a plan view of a second embodiment of an apparatus in accordance with the present invention.
Figure 8:
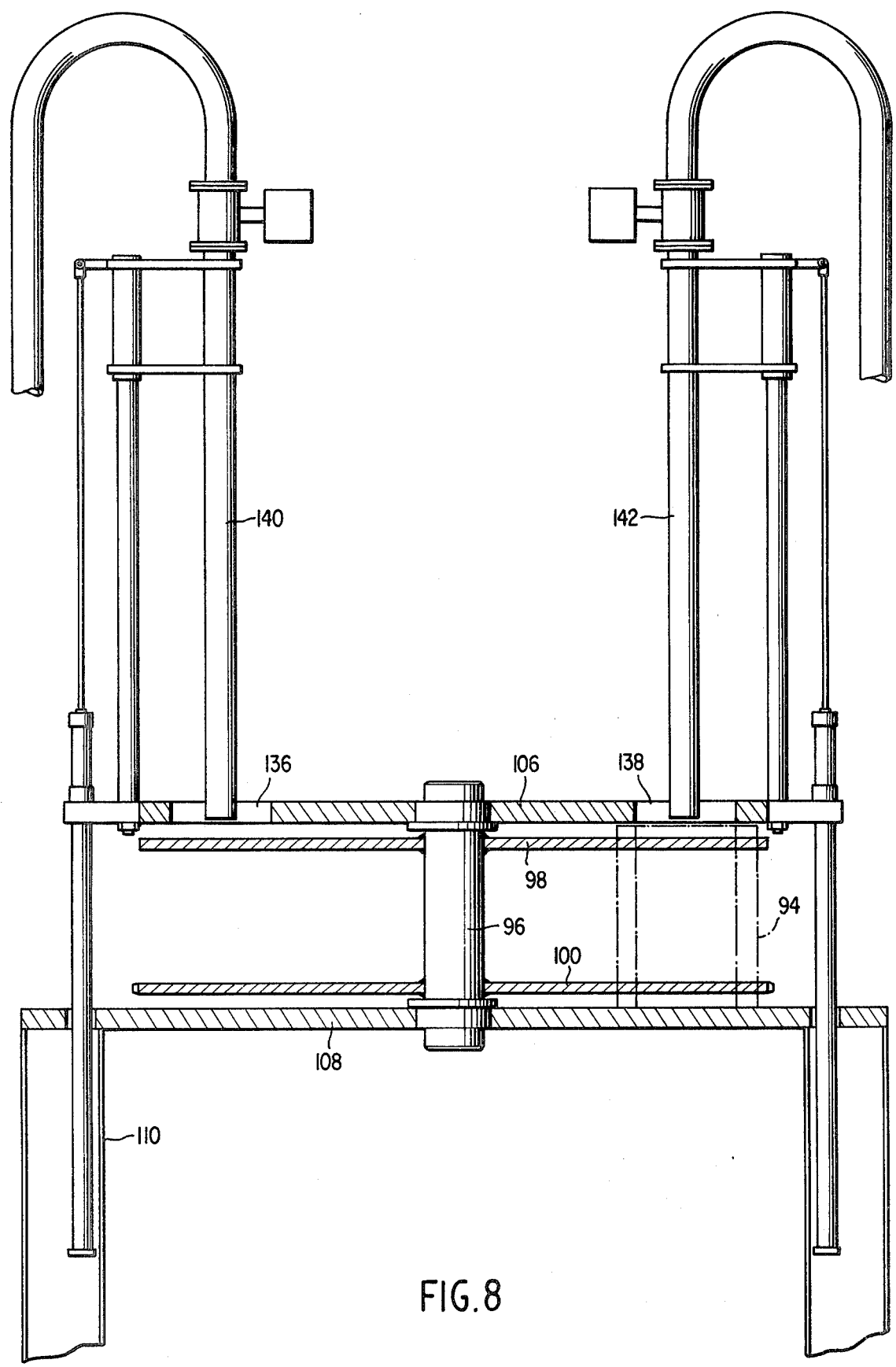
FIG. 8 is a sectional elevational view of the apparatus along line A—A of FIG. 7.
Figure 9:
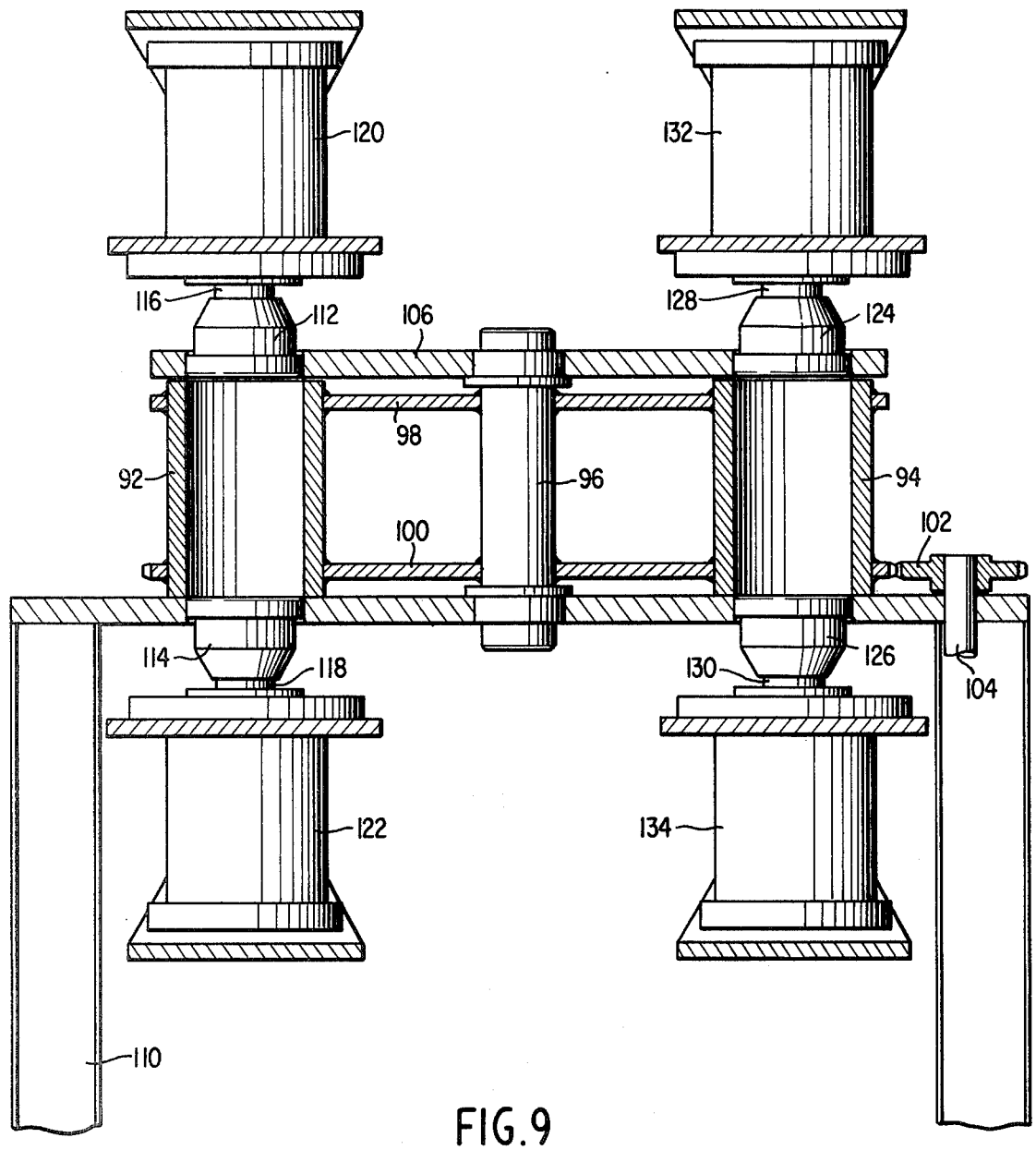
FIG. 9 is a sectional elevational view of the apparatus along line B—B of FIG. 7.

An alternative embodiment of a consolidation and separation apparatus in accordance with the present invention is shown in FIGS. 7 to 10. FIG. 7 is a plan view of a rotary apparatus 90 in which two consolidation chambers similar to that shown in FIG. 6 can be operated simultaneously. Referring to FIG. 9, a side elevational view of apparatus 90 along line B—B, two solid cylindrical consolidation chamber walls 92 and 94 are securely attached to rotating shaft 96 by means of circular supporting members 98 and 100. Cylindrical walls 92 and 94 are rotated about shaft 96 by means of drive gear 102 having teeth which engage with teeth around the circumference of supporting member 100. Drive gear 102 is rotated by shaft 104 attached to a rotating power source not shown. Shaft 96 is secured to and pivoted about supporting plates 106 and 108. Plate 108 is supported by frame 110. Above and below cylindrical chamber wall 92 are pistons 112 and 114 which are attached to piston rods 116 and 118, respectively.

Piston rods 116 and 118 are reciprocated by pressure means 120 and 122, such as the hydraulic cylinders shown. Similarly, piston 124, piston rod 128 and pressure means 132 are located above chamber wall 94 and piston 126, piston rod 130 and pressure means 134 are located below chamber wall 94. Pistons 112, 114, 124 and 126 are identical in structure and operation to pistons 16 and 18 shown in FIG. 6.

Initially, supporting members 98 and 100 are rotated so that cylindrical chamber walls 92 and 94 are located directly below openings 136 and 138 in plate 106. Directly above openings 136 and 138 are slurry feed pipes 140 and 142. Referring to FIG. 8 which is a side elevational view of apparatus 90 along line A—A of FIG. 7, cylindrical chamber wall 94 is shown in broken lines to illustrate the position that it would be in below feed pipe 142 and opening 138.

Figure 10:
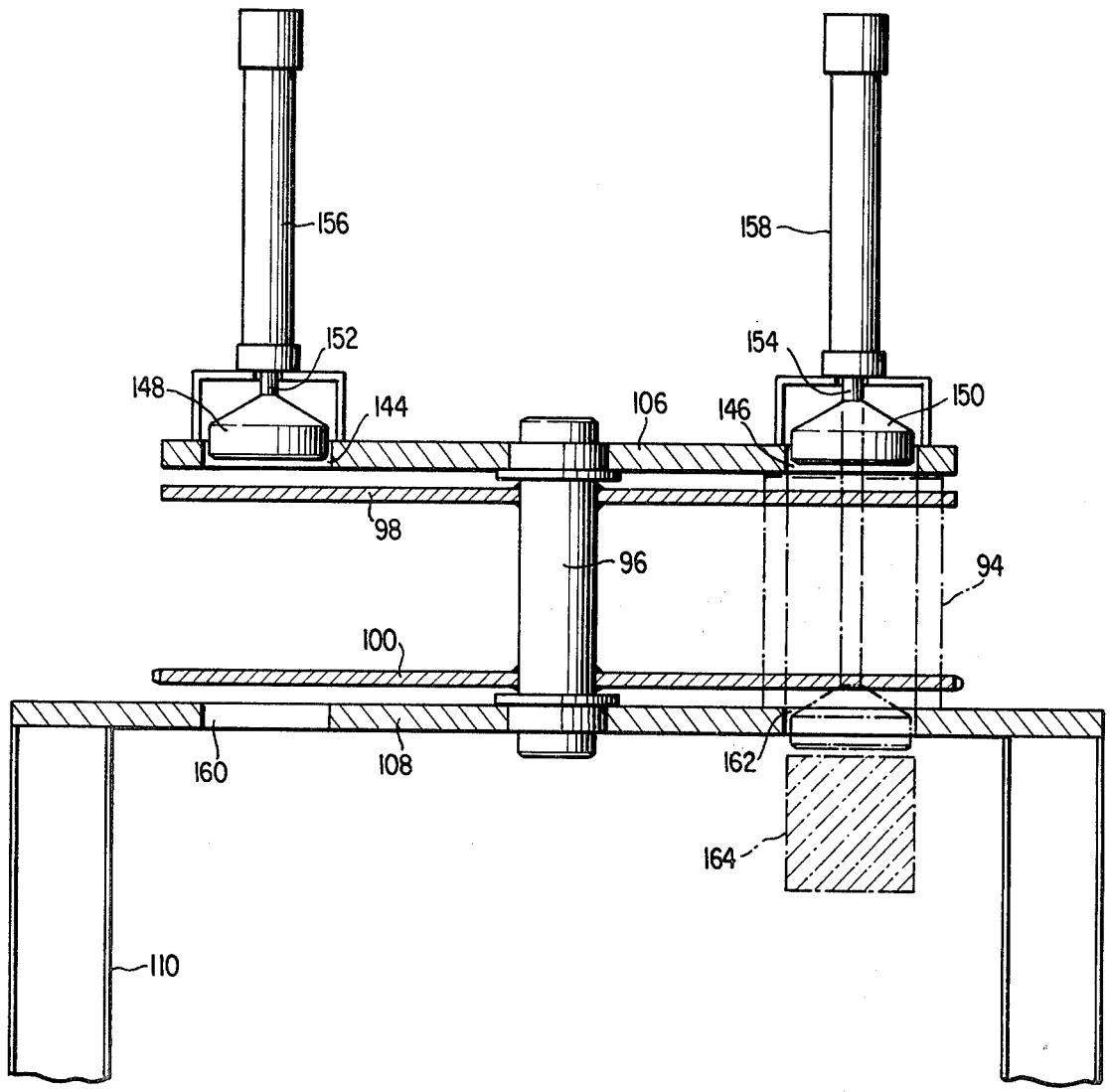
FIG. 10 is a sectional elevational view of the apparatus along line C—C of FIG. 7.

FIG. 10 is a side elevational view of apparatus 90 along line C—C in FIG. 7. Following consolidation of the slurry, cylindrical chamber walls 92 and 94 containing consolidated slugs of slurry are rotated by supporting members 98 and 100 around shaft 96 so that they are located below openings 144 and 146 in plate 106. Directly above openings 144 and 146 are pistons 148 and 150, which are attached to piston rods 152 and 154, respectively. Piston rods 152 and 154 are reciprocated by pressure means 156 and 158, shown as hydraulic cylinders. Openings 160 and 162 in supporting plate 108 are located directly below openings 144 and 146 in plate 106. The operation of piston 150 is shown by the broken lines in FIG. 10. When cylindrical chamber wall 94 is rotated around shaft 96 so that it is directly below opening 146 and directly above opening 162, pressure means 158 is actuated and applies compressive stress to piston 150 which forces slug 164 of consolidated slurry out of cylindrical wall 94 and through opening 162 where it falls from the apparatus to be collected or conveyed away by means not shown.

Figure 11:
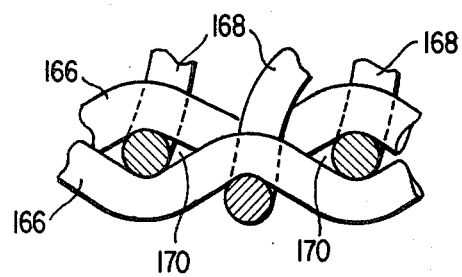
FIG. 11 is a perspective view of a screen employed in the apparatus of the present invention.

Referring to FIG. 11, which is a perspective view of a screen suitable for use in the apparatus of the present invention, numeral 166 refers to the wires woven in one direction and numeral 168 refers to the wires woven at right angles to wires 166. From this perspective view, quasi-triangular pores 170 which are formed by the close weave of the wires can be seen.

The operation of apparatus 90 can be seen with reference to FIGS. 7 to 10. Referring to FIG. 7, gear drive 102 is actuated and rotates in a counterclockwise direction, engaging the teeth around the circumference of circular supporting member 100 and thereby causing supporting members 98 and 100 and cylindrical chamber walls 92 and 94 to rotate in a clockwise direction around shaft 96. Cylindrical walls 92 and 94 are rotated until they are directly below openings 136 and 138, respectively, in plate 106. In FIG. 8, cylindrical wall 94 is shown by broken lines in position below opening 138. When the cylindrical walls are directly below the openings, gear drive 102 is stopped and predetermined amounts of slurry to be consolidated are fed through slurry feed pipes 140 and 142 and through openings 136 and 138 filling the interiors of cylindrical chamber walls 92 and 94. When the chamber walls are filled, gear drive 102 is actuated and rotated until wall 92 is directly below piston 112 and directly above piston 114 and wall 94 is directly below piston 124 and directly above piston 126, when gear drive 102 is stopped (FIG. 9). Then pressure means 120, 122, 132 and 134 are all actuated and apply compressive stress to pistons 112, 114, 124 and 126, respectively, thereby compressing the slurry within cylindrical chamber walls 92 and 94. When the slurry is subjected to this one-dimensional consolidation, substantially clean water is removed from the slurry and drains through the faces of pistons 112, 114, 124 and 126 in the same way that water drained through pistons 16 and 18 of apparatus 10 described above (FIG. 6). Following consolidation of the slurry and removal of the water therefrom, pistons 112, 114, 124 and 126 are retracted by pressure means 120, 122, 132 and 134, respectively. Then, gear drive 102 is actuated and rotated until cylindrical chamber walls 92 and 94, each of which having a slug of consolidated slurry held therein by frictional forces, are directly below openings 144 and 146 in plate 106, respectively. Pressure means 156 and 158 are then actuated and apply compressive stress to pistons 148 and 150, respectively, thereby ejecting the consolidated slugs out of cylindrical walls 92 and 94 and through openings 160 and 162 in plate 108, respectively. The ejected slugs are then collected or conveyed away by means not shown. The ejection of slug 164 from cylindrical wall 94 is shown by the broken lines in FIG. 10. Following ejection of the slugs, drive gear 102 is again actuated and rotated until cylindrical chamber walls 92 and 94 are in position to be filled with slurry. However, cylindrical walls 92 and 94 have now rotated 180° around shaft 96 so that they are now directly below openings 138 and 136, respectively. The procedure set forth above is then repeated so that the two cylindrical chamber walls are first simultaneously filled with slurry to be consolidated, then the two filled walls are rotated and then simultaneously subjected to one-dimensional consolidation of the slurry and removal of water therefrom, and finally the two walls containing slugs of consolidated slurry are rotated and then both slugs are simultaneously ejected from the walls. Using rotary apparatus 90, twice the amount of slurry consolidated by apparatus 10 can be continuously consolidated. It will be understood, that any number of fill, consolidation, and ejection stations desired can be located around the circumference of such a rotary apparatus provided the dimensions of the apparatus are adjusted accordingly.

Using the process described herein, coal slurry containing particles of coal, ash and other impurities and water, having less than about 30 percent by volume of ash and other impurities and preferably having a water content above its liquid limit, can be subjected to one-dimensional consolidation under an applied stress of about 900 psi to about 5000 psi to produce substantially clean water and a uniform slug of combustible fuel containing about 70 to 95 percent by volume coal, 5 to 30 percent by volume ash and other impurities, and a water content less than about 10 percent by weight, wherein the percents by volume are on a dry basis. The slug of fuel thus produced has a density in the range of 90 to 100 lb/ft$^3$ and a heating value in the range of about 10,000 to 13,000 Btu/lb. By comparison, mined coal, which varies greatly in composition depending on the seam from which it is mined generally contains about 8 to 15 percent by volume ash, 1 to 2 percent by volume sulfur and 3 to 8 percent water by weight with a density in the range of 85 to 95 lb/ft$^3$ and a heating value in the range of 10,000 to 13,000 Btu/lb.

The process disclosed herein provides an effective means of cleaning up the coal slurry in slurry ponds by producing substantially clean water which can be recycled to the coal washing plant for reuse or deposited in ponds, streams or other bodies of water without detrimentally affecting the environment. If the water removed from the slurry has excessive amounts of a particular chemical impurity, that impurity can be removed prior to discharging the water into a pond, stream or other body of water. The uniformly-shaped slug of consolidated coal slurry which is produced, is a valuable fuel product for industrial or home usage since it has a water content and heating value comparable to that of commercially available mined coal. If it is determined that the ash or sulfur content of the consolidated coal slurry are higher than desirable for a particular use because the heating value is low or the fuel does not comply with strict environmental standards, the coal slurry can be upgraded in quality by any of the well-known upgrading methods described above prior to consolidation. Such upgrading will insure that the slugs produced can be tailored to suit the requirements for a particular usage of the fuel.

In addition to providing a means for cleaning up the existing coal slurry ponds, the present process can be used to treat the new coal slurry which is being produced by the crushing and washing operations so that the need for building additional slurry ponds in the future will be eliminated. Small slurry ponds would be required only for occasional use during repair of the consolidation equipment or during emergency situations. It is also contemplated that the present process can be used to remove the water and consolidate the fines from the slurries carried by slurried coal pipelines, or to remove water from lignite which contains 20-45 percent moisture as mined with heating values of 5500-8300 Btu/lb or from low quality western coal.

A more complete appreciation of the invention will be realized by reference to the following specific examples which relate to specific consolidation methods and apparatus within the scope of the invention. The following examples are not intended to limit the invention disclosed herein except to the extent that limitations are specifically stated or to the extent to which limitations appear in the appended claims.

EXAMPLE 1

A cylindrical mold having an inside diameter of about 11.5 inches was filled with coal slurry to a height of about 1 inch. A piston was placed in the cylinder above the coal slurry. Then, a total pressure of about 30 tons, or about 580 psi, was applied to the piston for about 1 minute, subjecting the slurry to one-dimensional consolidation. Substantially clean water drained from the cylinder through a 75 micron mesh stainless steel screen positioned above a perforated plate which formed the wall of the cylindrical mold opposite the piston. The slug of consolidated coal slurry was removed from the mold and analyzed. The average moisture content was about 23.4 percent and the wet density was 79.58 lb/ft$^3$.

EXAMPLE 2

The procedure of Example 1 above was repeated using a second sample of coal slurry with the exception that a total pressure of about 50 tons, or about 960 psi, was applied to the piston for about 1 minute. Upon subjection of the sample to one-dimensional consolidation, substantially clean water drained from the cylinder. The slug of consolidated coal slurry was found to have a moisture content of about 8.7 percent and a wet density of 91.51 lb/ft$^3$.

EXAMPLE 3

The procedure of Example 1 above was repeated using a further sample of coal slurry with the exception that a total pressure of about 80 tons, or about 1540 psi, was applied to the piston for about 1 minute. Substantially clean water drained from the cylinder upon subjection of the sample to one-dimensional consolidation. The slug of consolidated coal slurry was found to have a moisture content of about 8.57 percent and a wet density of 92.54 lb/ft$^3$.

EXAMPLE 4

Following the procedure of Example 1 above, a sample of coal slurry was subjected to one-dimensional consolidation. The substantially pure water which drained from the cylinder was collected and analyzed. The water analysis is set forth in Table I below:

TABLE I

|  | Example 4 | Pennsylvania |
|---|---|---|
| Iron | 13 ppm | 1.5 ppm |
| Manganese | 0.54 ppm | 1.0 ppm |
| Threshold Odor Number | 4 | 24 |
| pH | 7.6 | 6.0-8.5 |
| Phenol | 0.022 ppm | 0.005 ppm |
| Dissolved solids | 4272 ppm | 500 ppm |
| Sulfate reported as S | 826 ppm | natural level |
| Fecal Coliform Bacteria | 1300/100 ml | 5000/100 ml |

The values obtained from the sample are compared in Table I to the Water Quality Criteria not to be exceeded for the Monongahela River Basin in the Commonwealth of Pennsylvania.

The amount of dissolved solids reported is believed to be due to the fact that the mold was not cleaned prior to use and impurities which were not completely removed from the mold, dissolved in the water being collected.

I claim:

1. A process for producing substantially clean water and consolidated slugs of fuel from coal slurry having less than about 30 percent by volume of ash and other impurities, comprising
   (a) placing a quantity of the coal slurry in an enclosed chamber in which means have been provided for drainage of the water from the slurry, and
   (b) subjecting the slurry to one-dimensional consolidation by the application of compressive stress, thereby producing
      (i) substantially clean water, and
      (ii) a consolidated uniformly-shaped slug of fuel having a water content of less than about 10 percent.

2. The process of claim 1 wherein the coal slurry has a water content above its liquid limit.

3. The process of claim 1 wherein the coal slurry is subjected to a compressive stress in the range of about 900 psi to about 5000 psi for a period of less than about 1 minute.

4. A product comprising a uniformly-shaped slug of consolidated coal slurry having less than about 30 percent by volume of ash and other impurities, a water content of less than about 10 percent and a density in the range of about 90 to 100 lb/ft$^3$.

5. The product of claim 4 wherein the slug comprises from about 70 to 95 percent by volume of coal and from about 5 to about 30 percent by volume of ash and other impurities.

6. Associatively formed products of a consolidation and separation process comprising (a) substantially clean water, and (b) a uniformly-shaped slug of consolidated coal slurry having less than about 30 percent by volume of ash and other impurities, a water content of less than about 10 percent and a density in the range of about 90 to 100 lb/ft$^3$.

7. The products of claim 6 wherein the slug comprises from about 70 to 95 percent by volume of coal and from about 5 to 30 percent by volume of ash and other impurities.

8. An apparatus for removing water from an aqueous slurry of solid particulate or fibrous material and for consolidating the solid material into a slug, comprising
   (a) a cylindrical consolidation chamber in which the slurry is to be consolidated and sealed against the passage of solid material therefrom, comprising
      (i) a longitudinal cylindrical wall,
      (ii) a circular wall near one end of said longitudinal wall, and
      (iii) a cylindrical piston movable longitudinally within said longitudinal wall,
   (b) a means for filling said chamber with the slurry,
   (c) a compression means for reciprocating said piston longitudinally within said chamber and for applying compressive stress to the slurry in said chamber to cause consolidation thereof,
   (d) a means for removing the consolidated slug from said chamber, and
   (e) a means for drainage of the water from said chamber during consolidation of the slurry comprising a porous member having a porous structure similar to the quasi-triangular porous structure of a woven screen having a mesh size in the range of about 50 to 100 microns and a means for drainage of the water which passes through the porous member.

9. The apparatus of claim 8 wherein the porous member is a woven screen having a mesh size in the range of about 50 to 100 microns.

10. The apparatus of claim 9 wherein the screen is in surface contact with the interior circular surface of said piston.

11. The apparatus of claim 10 wherein the screen has a mesh size of about 75 microns.

12. The apparatus of claim 11 wherein the screen is made of stainless steel.

13. The apparatus of claim 9 wherein the screen is in surface contact with the interior surface of said circular wall.

14. The apparatus of claim 13 wherein the screen has a mesh size of about 75 microns.

15. The apparatus of claim 14 wherein the screen is made of stainless steel.

16. The apparatus of claim 10 wherein the screen is in surface contact with the interior surface of said circular wall.

17. The apparatus of claim 16 wherein the screen has a mesh size of about 75 microns.

18. The apparatus of claim 17 wherein the screen is made of stainless steel.

19. An apparatus for removing water from an aqueous slurry of solid particulate or fibrous material and for consolidating the solid material into a slug, comprising
   (a) a cylindrical consolidation chamber in which the slurry is to be consolidated and sealed against the passage of solid material therefrom, comprising
      (i) a longitudinal cylindrical wall, and (ii) two cylindrical pistons extending into opposite ends of said wall and movable longitudinally within said wall, (b) a means for filling said chamber with the slurry, (c) at least one compression means for reciprocating a piston longitudinally within said chamber and for applying compressive stress to the slurry in said chamber to cause consolidation thereof, (d) a means for removing the consolidated slug from said chamber, (e) a porous member in surface contact with the interior circular surface of each of said pistons, said porous member having a porous structure similar to the quasi-triangular porous structure of a woven screen having a mesh size in the range of about 50 to 100 microns, and (f) a means for drainage of the water which passes through said porous member from said chamber.

20. The apparatus of claim 19 wherein the porous member is a woven screen having a mesh size in the range of about 50 to 100 microns.

21. The apparatus of claim 20 wherein the screen has a mesh size of about 75 microns.

22. The apparatus of claim 21 wherein the screen is made of stainless steel.

23. An apparatus for removing water from an aqueous slurry of solid particulate or fibrous material and for consolidating the solid material into a slug, comprising (a) a vertically aligned rotatable shaft, (b) at least one cylindrical wall having its longitudinal dimension vertically aligned, (c) a supporting means radially extending from said shaft and secured to each cylindrical wall, (d) a means for rotating each cylindrical wall around said shaft and for positioning each cylindrical wall serially at a slurry fill station, a consolidation station, and a slug ejection station, (e) at least one slurry fill station comprising (i) a means for filling said cylindrical wall with a predetermined amount of slurry and (ii) a means for actuating said filling means when said cylindrical wall is disposed vertically below said filling means, (f) at least one consolidation station comprising (i) two cylindrical pistons movable longitudinally within each cylindrical wall, one of which is disposed vertically above and the other of which is disposed vertically below a cylindrical wall positioned in the consolidation station, at least one of said pistons having a porous member in surface contact with the circular surface of said piston which faces said cylindrical wall, said porous member having a porous structure similar to the quasi-triangular porous structure of a woven screen having a mesh size in the range of about 50 to 100 microns, (ii) a means for drainage of the water which passes through each porous member, (iii) two compression means for reciprocating said pistons longitudinally within said cylindrical wall and for applying compressive stress to the slurry in said cylindrical wall to cause consolidation thereof, and (iv) a means for actuating said compression means when said cylindrical wall is disposed vertically between said pistons, (g) a means for maintaining the slurry within each cylindrical wall filled with slurry prior to consolidation of the slurry therein, (h) at least one slug ejection station comprising (i) a piston movable longitudinally within each cylindrical wall, (ii) a compression means for reciprocating said piston and for applying compressive stress to a consolidated slug within a cylindrical wall and causing ejection of the slug from within the wall, and (iii) means for actuating said compression means when said cylindrical wall is vertically aligned with said piston, wherein there are an equivalent number of slurry fill stations, consolidation stations and slug ejection stations.

24. The apparatus of claim 23 wherein each porous member is a woven screen having a mesh size in the range of about 50 to 100 microns.

25. The apparatus of claim 24 wherein the screen has a mesh size of about 75 microns.

26. The apparatus of claim 25 wherein the screen is made of stainless steel.

* * * * *